United States Patent [19]

Dworak et al.

[11] Patent Number: 4,938,944

[45] Date of Patent: Jul. 3, 1990

[54] METHOD OF AND REACTOR FOR PRODUCING CHLORINE DIOXIDE

[75] Inventors: Rainer Dworak, Wiesbaden; Peter Kohl, Neuberg; Karl Lohrberg, Heusenstamm; Reinhard Müller, Grossostheim, all of Fed. Rep. of Germany

[73] Assignee: Metallgesellschaft Aktiengesellschaft, Frankfurt am Main, Fed. Rep. of Germany

[21] Appl. No.: 361,036

[22] Filed: Jun. 2, 1989

[30] Foreign Application Priority Data

Jun. 10, 1988 [DE] Fed. Rep. of Germany ....... 3819763

[51] Int. Cl.$^5$ ............................................. C01B 11/02
[52] U.S. Cl. ................................................... 423/478
[58] Field of Search .......................... 423/478, 479, 480

[56] References Cited

U.S. PATENT DOCUMENTS

| | | | |
|---|---|---|---|
| 2,664,341 | 12/1953 | Kesting | 423/478 |
| 3,404,952 | 10/1968 | Westerlund | 423/478 |
| 4,251,502 | 2/1981 | Forster | 423/478 |
| 4,851,198 | 7/1989 | Lohrberg | 261/110 |

FOREIGN PATENT DOCUMENTS 0095199 4/1983 European Pat. Off. .

*Primary Examiner*—Jeffrey E. Russel
*Assistant Examiner*—Stephen G. Kalinchak
*Attorney, Agent, or Firm*—Herbert Dubno

[57] ABSTRACT

For the production of a gaseous mixture contains chlorine dioxide and chlorine, alkali chlorate in an aqueous solution with acid is reacted in a reactor. The reactor comprises a plurality of superimposed reaction levels which are traversed by the solution from top to bottom. In the lower portion of the reactor the solution in which chlorate and acid have been depleted is reboiled in a reboiling chamber by an indirect heating at a temperature in the range from 100° to 110° C. The depleted solution is conducted from the reboiling chamber to a pressure chamber, in which a pressure of at least 1.2 bar is maintained. In the pressure chamber the solution is reboiled at temperatures from 110° to 150° C. and the vapors formed by the reboiling in the pressure chamber are conducted through the reboiling chamber for an indirect heating therein.

4 Claims, 1 Drawing Sheet

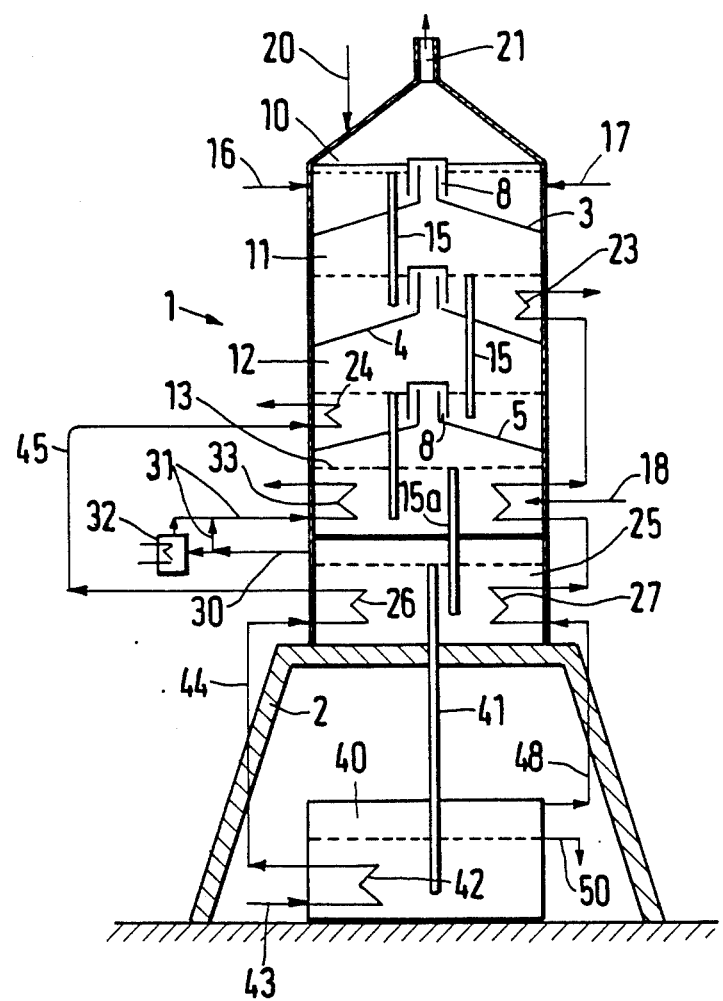

METHOD OF AND REACTOR FOR PRODUCING CHLORINE DIOXIDE

FIELD OF THE INVENTION

Our present invention relates to a process of reacting alkali chlorate in an aqueous solution with acid, particularly hydrochloric acid, to produce a gaseous mixture which contains chlorine dioxide and chlorine in a reactor that comprises a plurality of superimposed reaction levels which are traversed by the solution from top to bottom and wherein the solution in which chlorate and acid have been depleted is reboiled in the lower portion of the reactor in a reboiling chamber by an indirect heating at a temperature in the range from 100° to 110° C. The invention also relates to a reactor for carrying out this method.

BACKGROUND OF THE INVENTION

A process and reactor for producing chlorine dioxide are known from European Pat. No. 0 095 199 and Published German Application No. 37 19 878. Reference may also be had to U.S. patent application Ser. No. 06/942,522 filed Dec. 16, 1986 now abandoned and the Continuation U.S. application thereof, Ser. No. 07/170,665 filed Mar. 10, 1988, now U.S. Pat. No. 4,851,198.

The reaction is preferably effected in accordance with the reaction equation $2NaClO_3 + 4HCl = 2ClO_2 + Cl_2 + 2NaCl + 2H_2O$.

HCl serves advantageously as an acid and as a reducing agent so that there is no need for a separate addition of reducing agent if hydrochloric acid is used.

OBJECT OF THE INVENTION

It is an object of our invention to improve the economy of the known process and particularly to permit the resulting water to be removed by reboiling with a minimum energy.

SUMMARY OF THE INVENTION

This object and others which will become apparent hereinafter are attained, in accordance with the invention, in that the depleted solution is conducted from the reboiling chamber to a pressure chamber, a pressure of at least 1.2 bars is maintained in the pressure chamber, the solution is reboiled in the pressure chamber at temperatures from 110° to 150° C. and tho vapors formed by the reboiling in the pressure chamber are passed through the reboiling in the pressure chamber are passed through the reboiling chamber and/or a reaction level for effecting an indirect heating therein. More particularly, the method comprises the steps of:

(a) reacting an alkali chlorate with an acid in a plurality of superposed reactor levels in an upright reactor while introducing alkali chlorate and acid at an upper level, permitting gaseous chlorine dioxide to bubble through liquid reaction phases at the levels and to be withdrawn from the upper level, and causing the liquid reaction phases to pass downwardly from the upper level to successively lower levels;

(b) feeding a solution from which chlorate and acid have been depleted from a lowermost reactor level to a reboiling chamber in the reactor below the lowermost reactor level;

(c) indirectly heating the solution in the reboiling chamber at a temperature of substantially 100° to 110° C.;

(d) conducting depleted solution from the reboiling chamber to a pressure chamber maintained at a pressure of at least 1.2 bar;

(e) indirectly heating the depleted solution in the pressure chamber at the pressure at a temperature of substantially 110° to 150° C. to reboil the depleted solution in the pressure chamber and form vapors therein; and (f) indirectly heating selectively the depleted solution in the reboiling chamber or the liquid reaction phase in at least one of the levels by heat exchange with the vapors.

According to a further feature of the invention, the solution is indirectly heated with steam in the pressure chamber and the steam o the resulting condensate is subsequently passed through the reboiling chamber and/or a reaction level for effecting an indirect heating therein.

It is also another feature of the invention to conduct the vapors which have been formed in the reboiling chamber through at least one reaction level.

There is usually a pressure of about 1 bar in the reboiling chamber and a higher pressure of at least 1.2 bars in the pressure chamber. That pressure difference can be produced by locating the pressure chamber under the reboiling chamber connecting the two chambers by a downcomer so that the hydrostatic pressure of the solution in the reboiling chamber is applied to the pressure chamber.

BRIEF DESCRIPTION OF THE DRAWING

The above and other objects, features and advantages of the present invention, will become more readily apparent from the following description, the sole FIGURE of which is a diagrammatic longitudinal sectional view showing the reactor.

SPECIFIC DESCRIPTION

The approximately cylindrical reactor 1 has a main portion mounted on an elevated platform 2. The reactor comprises a plurality of superimposed plates 3, 4, 5, which have approximately the shape of an inverted funnel. Each plate has a central gas passage 8.

Each plate constitutes the bottom of a reaction level. Whereas the embodiment shown in the drawing comprises four reaction stories 10, 11, 12, 13, the number of reaction levels actually used may differ.

Each reaction level is provided with a downcomer 15, through which the solution can flow from one level to the next lower level.

At least the uppermost level is provided with one or more supply lines 16, 17 for acid, particularly hydrochloric acid. Purging air is supplied to the lowermost reaction level through the line 18.

The alkali chlorate to be reacted comes from an electrolytic plant, for example, and is supplied through line 20 to the uppermost reaction level 10 of the reactor 1. The solution can contain 500 g $NaClO_3$ per liter. In the drawing the liquid levels in each reaction level and in the chamber are indicated by horizontal broken lines.

The gaseous mixture of $ClO_2$ and $Cl_2$ which has been formed by the reaction rises together with the purging air from level to level through the respective central gas passages 8, bubbles through the liquid reaction phases, and is withdrawn at the top outlet 21.

In order to intensify the reaction, individual reaction levels are provided with means 23, 24 for indirect heating.

It is desirable to adjust temperature to that of th temperatures used from top to bottom in the reaction levels 10 to 13.

The solution in which chlorate has been depleted finally flows through the downcomer 15a into the reboiling chamber 25 and is heated to the boil therein under a pressure of about 1 bar. The heat required for that purpose is supplied by the means 26, 27 for indirect heating.

The boiling temperature in the reboiling chamber 25 is in the range from 100° to 110° C. so that the resulting vapor has a high water vapor content. That vapor is withdrawn through line 30 and is conducted to the pipe coil 33 for indirect heating in part directly through line 31 or in part through a cooler 32. The condensate which has been formed from the vapors by an extraction of heat may be used in a manner (not shown) for a further heating in one of the overlying reaction levels. The cooler 32 serves to regulate the temperature use for heating.

A pressure chamber 40 is provided below the reboiling chamber 25 and is connected to the reboiling chamber by a downcomer 41 The solution flows from the reboiling chamber 25 through the line 41 to the underlying pressure chamber 40. As the hydrostatic pressure of the liquid in the chamber 25 is applied to the liquid in the chamber 40, a higher pressure is obtained in the pressure chamber so that the boiling temperature of the solution is increased to at least 110° and possibly up to 150° C. The difference in elevation between the liquid levels in the two chambers 25 and 40 may be selected as desired and will mainly be selected in consideration of cost. Differences in elevation from 1 to 8 meters and preferably from 2 to 6 meters are deemed suitable.

The pressure chamber 40 is also provided with means 42 for indirect heating. This means are preferably fed with steam from line 43. The heating fluid is subsequently conducted through line 44 to the means 26 for an indirect heating in the reboiling chamber 25 and finally through line 45 to the means 24 for an indirect heating in the reaction story 12. Alternatively, the heating fluid conducted from the pressure chamber 40 in the line 44 may be used in the various reaction levels for other purposes.

The vapor which has been formed in the pressure chamber 40 and has a high water vapor content is withdrawn in the line 48 and is used first for heating in the reboiling chamber 25 and then as condensate in the reaction story 13 and finally in the reaction level 11. That vapor and its condensate may also be used for different heating purposes. But it will be recommendable to use the vapor initially for an indirect heating in the reboiling chamber 25 because the heat of condensation can be utilized in a desirable manner in that case.

The solution which has been reboiled to decrease its water content leaves the pressure chamber 40 through line 50 and may, e.g., be returned to an electrolytic plant for re-enriching the solution with chlorate.

SPECIFIC EXAMPLE

From an electrolytic plant for producing chlorate a chlorate-containing solution in a total amount of 11,747 kg is supplied through line 20 to the reactor 1. The solution consists of 4,284 kg $NaClO_3$, 857 kg NaCl, 43 kg $Na_2Cr_2O_7$ and 6,563 kg water and is at a temperature of 40° C. That solution is reacted with water-containing acid consisting of 1,345 kg HCl and 2,859 kg water. The reactor 1 is designed as shown in the drawing and comprises four reaction levels 10 to 13. The acid is distributed to a plurality of inlets, through which it is fed to the uppermost story 10. 1,461 kg purging air are supplied through line 18 and are sucked upwardly through the reaction stories. The product gas in the outlet 21 contains 1,010 kg $ClO_2$, 770 kg $Cl_2$ and 172 kg $H_2O$ and the accompanying purging air. 1,850 kg water must be removed from the system.

The difference between the elevations of the liquid levels in the pressure chamber 40 and the reboiling chamber 25 is 2 meters. Under the pressure of 1 bar in the reboiling chamber, the liquid in the reboiling chamber has a boiling temperature of 105° C. A pressure of about 1.25 bars is maintained in the pressure chamber, in which the boiling temperature is 120° C. To boil out the liquid in the pressure chamber, 1,600 kg steam at 150° C are supplied to the heat exchanger 42 through line 43. A condensate-steam mixture is conducted through line 44 into the reboiling chamber. The condensate is finally supplied to the exchanger 24 in the third reaction level 12 and is withdrawn from the latter at a temperature of 80° C.

At a temperature of 120° C. the vapors formed in the pressure chamber are conducted in line 48 to the reboiling chamber, in which they condensate in the heat exchanger 27. The resulting condensate is used for heating in th reaction levels 12 and 11. In the manner that is illustrated in the drawing, the vapors formed in the reboiling chamber 25 are conducted through the reaction level 13. By the cooler 32, the amount of $H_2$ which is removed as condensate is controlled to maintain an overall mass balance.

We claim:

1. A method of producing chlorine dioxide which comprises the steps of:
   (a) reacting an alkali chlorate with an acid in a plurality of superposed reactor levels in an upright reactor while introducing alkali chlorate and acid at an upper level, permitting gaseous chlorine dioxide to bubble through liquid reaction phases at said levels and to be withdrawn from said upper level, and causing said liquid reaction phases to pass downwardly from said upper level to successively lower levels;
   (b) feeding a solution from which chlorate and acid have been depleted from a lowermost reactor level to a reboiling chamber in said reactor below said lowermost reactor level;
   (c) indirectly heating said solution in said reboiling chamber at a temperature of substantially 100° to 110° C;
   (d) conducting depleted solution from said reboiling chamber to a pressure chamber maintained at a pressure of at least 1.2 bar;
   (e) indirectly heating said depleted solution in said pressure chamber at said pressure at a temperature of substantially 110° to 150° C. to reboil said depleted solution in said pressure chamber and form vapors therein; and
   (f) indirectly heating the depleted solution in said reboiling chamber or the liquid reaction phase in at least on of said levels by heat exchange with said vapors.

2. The method defined in claim 1 wherein said depleted solution in said pressure chamber is indirectly heated with steam and a steam condensate is formed, said method further comprising the step of passing s id condensate in indirect heat exchange with the depleted solution in said reboiling chamber or the liquid reaction phase in at least one of said levels for heating thereof.

3. The method defined in claim 2 wherein vapors are formed by reboiling in said reboiling chamber, said method further comprising the step of passing the vapor formed by reboiling in said reboiling chamber in indirect heat exchange with the liquid reaction phase in at least one of said levels for heating thereof.

4. The method defined in claim 1 wherein vapors are formed by reboiling in said reboiling chamber, said method further comprising the step of passing the vapors formed by reboiling in said reboiling chamber in indirect heat exchange with the liquid reaction phase in at least one of said levels for heating thereof.

* * * * *